(12) United States Patent
Bonsor et al.

(10) Patent No.: US 11,366,825 B1
(45) Date of Patent: Jun. 21, 2022

(54) METHOD AND SYSTEM FOR MANAGING RELATIONAL TRANSACTIONS IN A WORKSPACE INVENTORY AND ANALYTICS SERVICE

(71) Applicant: JPMorgan Chase Bank, N.A., New York, NY (US)

(72) Inventors: Aditya Bonsor, Pune (IN); Raghavendra Tigulla, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/154,246

(22) Filed: Jan. 21, 2021

(51) Int. Cl.
*G06F 16/00* (2019.01)
*G06F 16/25* (2019.01)
*G06F 9/54* (2006.01)
*G06F 16/22* (2019.01)
*G06F 16/21* (2019.01)

(52) U.S. Cl.
CPC ............ *G06F 16/258* (2019.01); *G06F 9/541* (2013.01); *G06F 16/212* (2019.01); *G06F 16/2282* (2019.01); *G06F 16/252* (2019.01)

(58) Field of Classification Search
CPC .................................................. G06F 16/254
See application file for complete search history.

(56) References Cited

U.S. PATENT DOCUMENTS

| | | | |
|---|---|---|---|
| 10,346,374 B1* | 7/2019 | Johnson | G06F 16/254 |
| 10,671,641 B1* | 6/2020 | Holenstein | G06F 16/284 |
| 2013/0246376 A1* | 9/2013 | Padmanabhan | G06F 16/254 |
| | | | 707/694 |

* cited by examiner

*Primary Examiner* — Cheryl Lewis
(74) *Attorney, Agent, or Firm* — Greenblum & Bernstein, P.L.C.

(57) ABSTRACT

A method for managing relational transactions in a workspace inventory and analytics service is provided. The method includes retrieving, via a communication interface, device data from a source by invoking a source application programming interface, the device data including a source data set identifier; persisting the device data in a staging table of a staging database; mapping the source data set identifier to a predefined data set identifier; transforming, by using a model, the device data from the staging table into a key value pair based on the mapping; persisting the key value pair in a device metadata table of an asset database; and invoking a service.

20 Claims, 6 Drawing Sheets

METHOD AND SYSTEM FOR MANAGING RELATIONAL TRANSACTIONS IN A WORKSPACE INVENTORY AND ANALYTICS SERVICE

BACKGROUND

1. Field of the Disclosure

This technology generally relates to methods and systems for managing workspace inventory, and more particularly to methods and systems for managing relational transactions in a workspace inventory and analytics service by using device agnostic data models and dynamic, configuration driven ingestion of data.

2. Background Information

Many business entities provide technology assets to employees to facilitate day-to-day operations. These technology assets may differ drastically from one type to another and may include user devices such as, for example, personal computers, laptops, and even universal serial bus (USB) peripheral devices. Historically, traditional management of these technology assets on a defined schema per device basis has resulted in varying degrees of success with respect to satisfying compliance requirements, billing requirements, ownership requirements, and usage requirements.

One drawback of using conventional technology asset management systems is that, due to the constantly evolving technology landscape requiring an almost continuous offering of new technology assets, ingestion of large numbers of the new technology assets with different characteristics and attributes may overwhelm existing inventory schemas. As a result, ingestion of the new technology assets requires large amounts of time and numerous development cycles. Additionally, conventional technology asset management systems are usually limited to certain asset types and are not able to cater to varying asset types in terms of metadata attribution and device discovery sources.

Therefore, there is a need for a workspace inventory and analytics service that manages relational transactions by using device agnostic data models and dynamic, configuration driven data ingestion to flexibly ingest different technology asset types, provide strong transaction management capabilities, offer high throughput read and write operation, and deliver rapid integration of device discovery sources.

SUMMARY

The present disclosure, through one or more of its various aspects, embodiments, and/or specific features or sub-components, provides, inter alia, various systems, servers, devices, methods, media, programs, and platforms for managing relational transactions in a workspace inventory and analytics service by using device agnostic data models and dynamic, configuration driven ingestion of data.

According to an aspect of the present disclosure, a method for managing relational transactions in a workspace inventory and analytics service is provided. The method is implemented by at least one processor. The method may include retrieving, via a communication interface, device data from a source by invoking a source application programming interface, the device data may include at least one source data set identifier, persisting the device data in at least one staging table of at least one staging database; mapping the at least one source data set identifier to at least one predefined data set identifier; transforming, by using at least one model, the device data from the at least one staging table into at least one key value pair based on the mapping; persisting the at least one key value pair in at least one device metadata table of at least one asset database; and invoking at least one service.

In accordance with an exemplary embodiment, the method may further include receiving, via the communication interface, at least one request, the request may include an information inquiry relating to a device; retrieving the at least one key value pair; identifying data corresponding to the device from the at least one key value pair; and transmitting, via the communication interface, the data in response to the request.

In accordance with an exemplary embodiment, the at least one service may include an asset service, an employee service, an occupancy service, an audit service, and at least one utility service.

In accordance with an exemplary embodiment, the asset service may include a function corresponding to at least one from among a device search function, an asset application programing interface expose function, and a model update function.

In accordance with an exemplary embodiment, the occupancy service may include a function corresponding to at least one from among a desk detail management function, an occupant search function, a seat location management function, and a communication endpoint management function.

In accordance with an exemplary embodiment, the at least one utility service may include an event service, an authorization service, a billing service, and a notification service.

In accordance with an exemplary embodiment, the event service may include a function corresponding to at least one from among an event creating function, an event publishing function, and an event logging function.

In accordance with an exemplary embodiment, the authorization service may include a function corresponding to a user level permission management function.

In accordance with an exemplary embodiment, the notification service may include a function corresponding to a sending notification function.

In accordance with an exemplary embodiment, the device data may include at least one from among an open standard file format, a proprietary standard file format, and a data interchange format.

According to an aspect of the present disclosure, a computing device configured to implement an execution of a method for providing automated support services by utilizing artificial intelligence is disclosed. The computing device comprising a processor; a memory; and a communication interface coupled to each of the processor and the memory, wherein the processor may be configured to retrieve, via a communication interface, device data from a source by invoking a source application programming interface, the device data may include at least one source data set identifier; persist the device data in at least one staging table of at least one staging database; map the at least one source data set identifier to at least one predefined data set identifier; transform, by using at least one model, the device data from the at least one staging table into at least one key value pair based on the mapping; persist the at least one key value pair in at least one device metadata table of at least one asset database; and invoke at least one service.

In accordance with an exemplary embodiment, the processor may be further configured to receive, via the communication interface, at least one request, the request may include an information inquiry relating to a device; retrieve the at least one key value pair; identify data corresponding to the device from the at least one key value pair, and transmit, via the communication interface, the data in response to the request.

In accordance with an exemplary embodiment, the at least one service may include an asset service, an employee service, an occupancy service, an audit service, and at least one utility service.

In accordance with an exemplary embodiment, the asset service may include a function corresponding to at least one from among a device search function, an asset application programing interface expose function, and a model update function.

In accordance with an exemplary embodiment, the occupancy service may include a function corresponding to at least one from among a desk detail management function, an occupant search function, a seat location management function, and a communication endpoint management function.

In accordance with an exemplary embodiment, the at least one utility service may include an event service, an authorization service, a billing service, and a notification service.

In accordance with an exemplary embodiment, the event service may include a function corresponding to at least one from among an event creating function, an event publishing function, and an event logging function.

In accordance with an exemplary embodiment, the authorization service may include a function corresponding to a user level permission management function.

In accordance with an exemplary embodiment, the notification service may include a function corresponding to a sending notification function.

In accordance with an exemplary embodiment, the device data may include at least one from among an open standard file format, a proprietary standard file format, and a data interchange format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
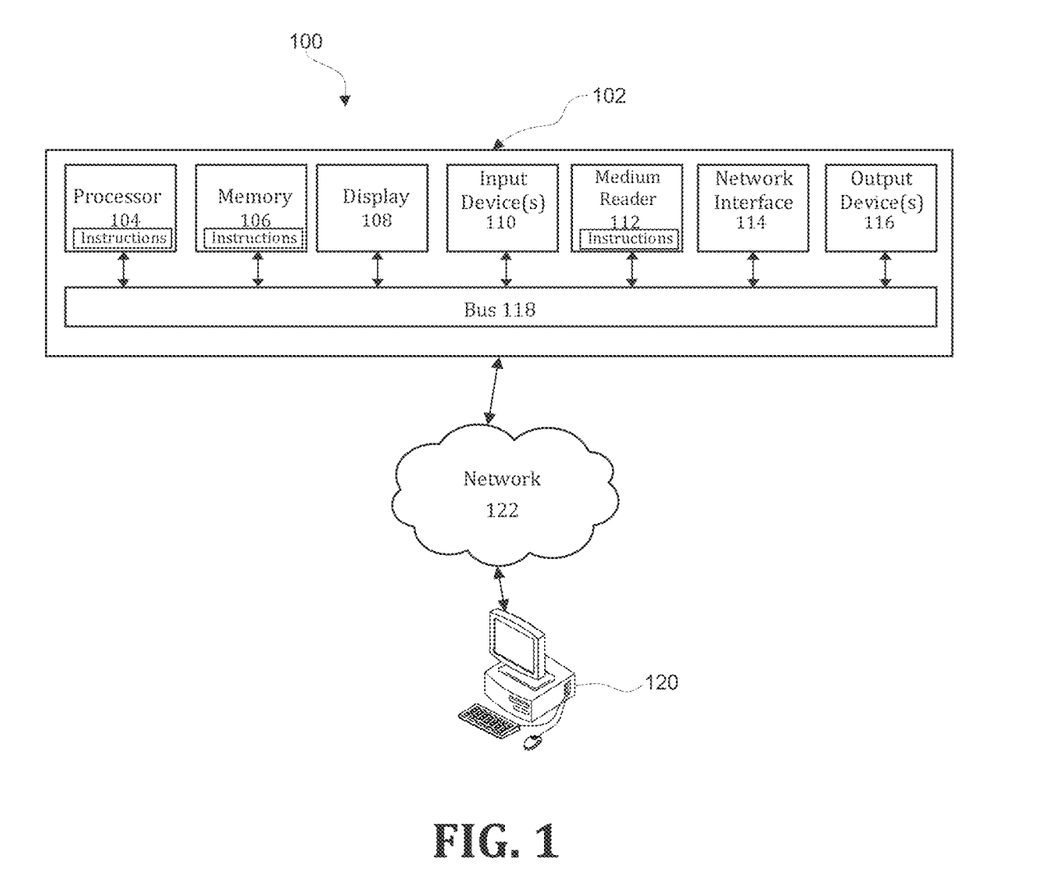
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for managing relational transactions in a workspace inventory and analytics service by using device agnostic data models and dynamic, configuration driven ingestion of data.

Figure 2:
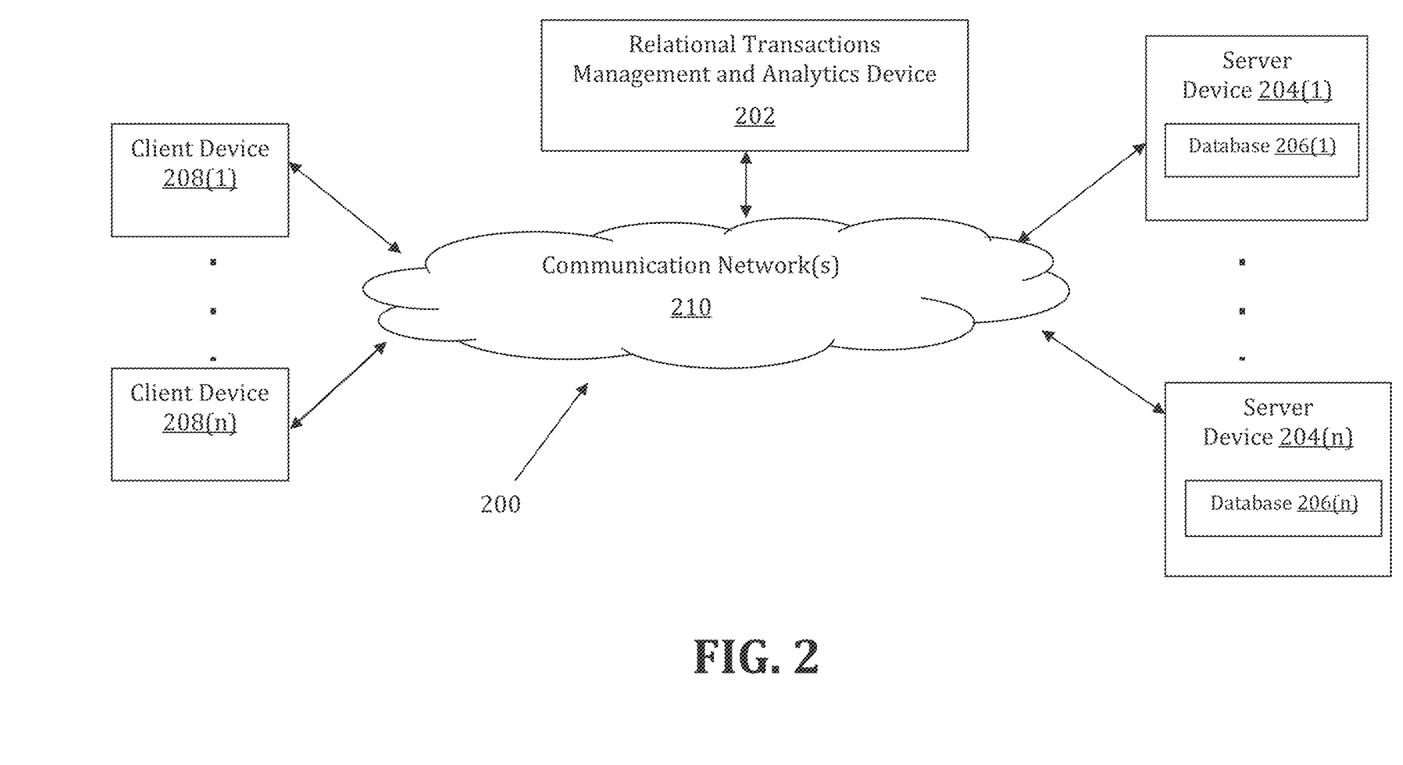
FIG. 2 illustrates an exemplary diagram of a network environment.

Referring to FIG. 2, a schematic of an exemplary network environment 200 for implementing a method for managing relational transactions in a workspace inventory and analytics service by using device agnostic data models and dynamic, configuration driven ingestion of data is illustrated. In an exemplary embodiment, the method is executable on any networked computer platform, such as, for example, a personal computer (PC).

The method for managing relational transactions in a workspace inventory and analytics service by using device agnostic data models and dynamic, configuration driven ingestion of data may be implemented by a Relational Transactions Management and Analytics (RTMA) device 202. The RTMA device 202 may be the same or similar to the computer system 102 as described with respect to FIG. 1. The RTMA device 202 may store one or more applications that can include executable instructions that, when executed by the RTMA device 202, cause the RTMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTMA device 202 itself, may be located in virtual server(s) running in a cloud-based computing environment rather than being tied to one or more specific physical network computing devices. Also, the application(s) may be running in one or more virtual machines (VMs) executing on the RTMA device 202. Additionally, in one or more embodiments of this technology, virtual machine(s) running on the RTMA device 202 may be managed or supervised by a hypervisor.

In the network environment 200 of FIG. 2, the RTMA device 202 is coupled to a plurality of server devices 204(1)-204(n) that hosts a plurality of databases 206(1)-206(n), and also to a plurality of client devices 208(1)-208(n) via communication network(s) 210. A communication interface of the RTMA device 202, such as the network interface 114 of the computer system 102 of FIG. 1, operatively couples and communicates between the RTMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and RTMA devices that efficiently implement a method for managing relational transactions in a workspace inventory and analytics service by using device agnostic data models and dynamic, configuration driven ingestion of data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g, voice, modem, and the like), Public Switched Telephone Network (PSTNs), Ethernet-based Packet Data Networks (PDNs), combinations thereof, and the like.

The RTMA device 202 may be a standalone device or integrated with one or more other devices or apparatuses, such as one or more of the server devices 204(1)-204(n), for example. In one particular example, the RTMA device 202 may include or be hosted by one of the server devices 204(1)-204(n), and other arrangements are also possible. Moreover, one or more of the devices of the RTMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to device data, source data set identifiers (i.e., source columns), predefined data set identifiers (i.e., predefined columns), staging tables, metadata tables, and key value pairs.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the RTMA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the RTMA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the RTMA device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTMA device 202, the server devices 204(1)-204(*n*), or the client devices 208(1)-208(*n*), for example, may be configured to operate as virtual instances on the same physical machine. In other words, one or more of the RTMA device 202, the server devices 204(1)-204(*n*), or the client devices 208(1)-208(*n*) may operate on the same physical device rather than as separate devices communicating through communication network(s) 210. Additionally, there may be more or fewer RTMA devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
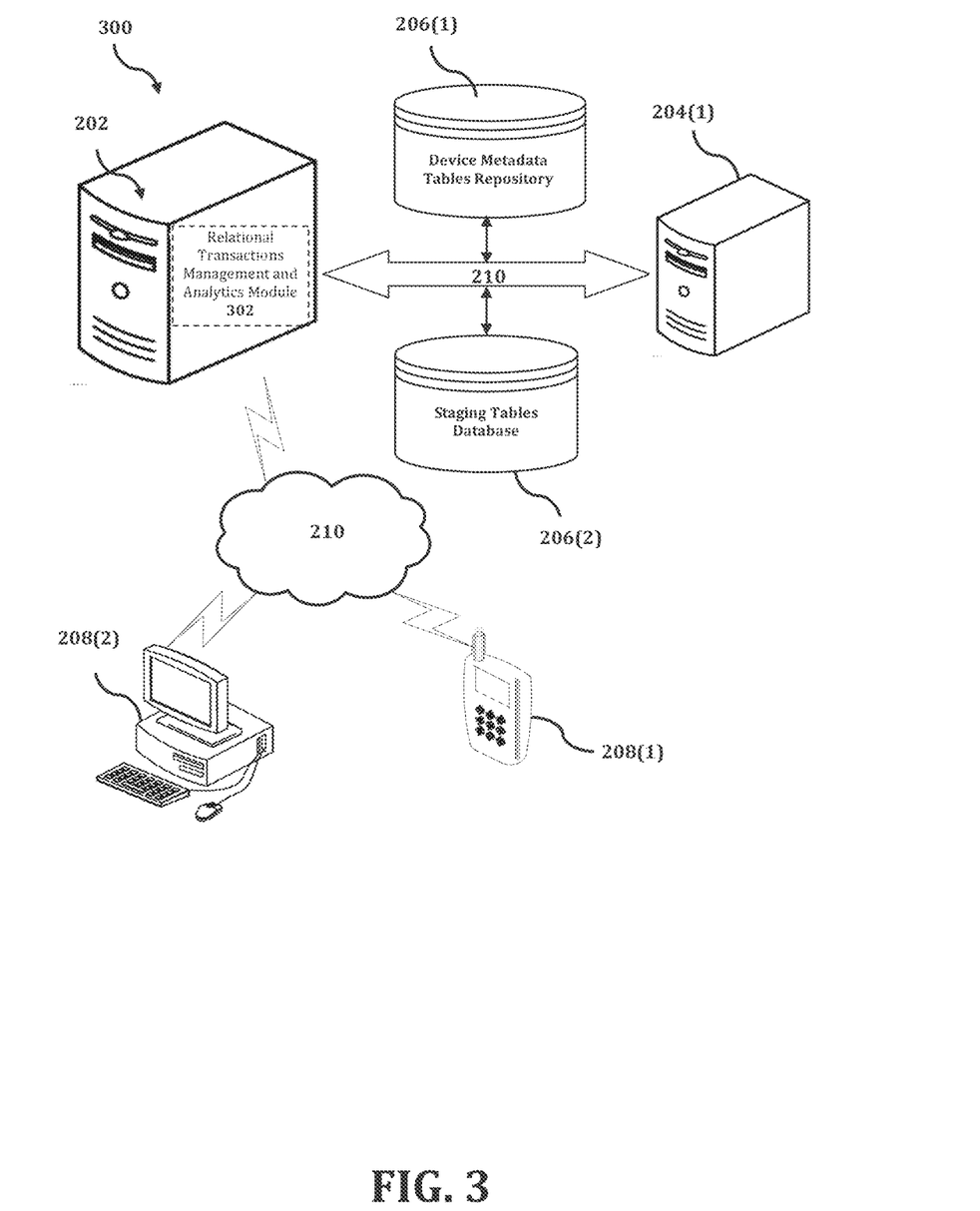
FIG. 3 shows an exemplary system for implementing a method for managing relational transactions in a workspace inventory and analytics service by using device agnostic data models and dynamic, configuration driven ingestion of data.

The RTMA device 202 is described and shown in FIG. 3 as including a relational transactions management and analytics module 302, although it may include other rules, policies, modules, databases, or applications, for example. As will be described below, the relational transactions management and analytics module 302 is configured to implement a method for managing relational transactions in a workspace inventory and analytics service by using device agnostic data models and dynamic, configuration driven ingestion of data.

An exemplary process 300 for implementing a mechanism for managing relational transactions in a workspace inventory and analytics service by using device agnostic data models and dynamic, configuration driven ingestion of data by utilizing the network environment of FIG. 2 is shown as being executed in FIG. 3. Specifically, a first client device 208(1) and a second client device 208(2) are illustrated as being in communication with RTMA device 202. In this regard, the first client device 208(1) and the second client device 208(2) may be "clients" of the RTMA device 202 and are described herein as such. Nevertheless, it is to be known and understood that the first client device 208(1) and/or the second client device 208(2) need not necessarily be "clients" of the RTMA device 202, or any entity described in association therewith herein. Any additional or alternative relationship may exist between either or both of the first client device 208(1) and the second client device 208(2) and the RTMA device 202, or no relationship may exist.

Further, RTMA device 202 is illustrated as being able to access a device metadata tables repository 206(1) and a staging tables database 206(2). The relational transactions management and analytics module 302 may be configured to access these databases for implementing a method for managing relational transactions in a workspace inventory and analytics service by using device agnostic data models and dynamic, configuration driven ingestion of data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein The process may be executed via the communication network(s)210, which may comprise plural networks as described above. For example, in an exemplary embodiment, either or both of the first client device 208(1) and the second client device 208(2) may communicate with the RTMA device 202 via broadband or cellular communication. Of course, these embodiments are merely exemplary and are not limiting or exhaustive.

Upon being started, the relational transactions management and analytics module 302 executes a process for managing relational transactions in a workspace inventory and analytics service by using device agnostic data models and dynamic, configuration driven ingestion of data. An exemplary process for managing relational transactions in a workspace inventory and analytics service by using device agnostic data models and dynamic, configuration driven ingestion of data is generally indicated at flowchart 400 in FIG. 4.

Figure 4:
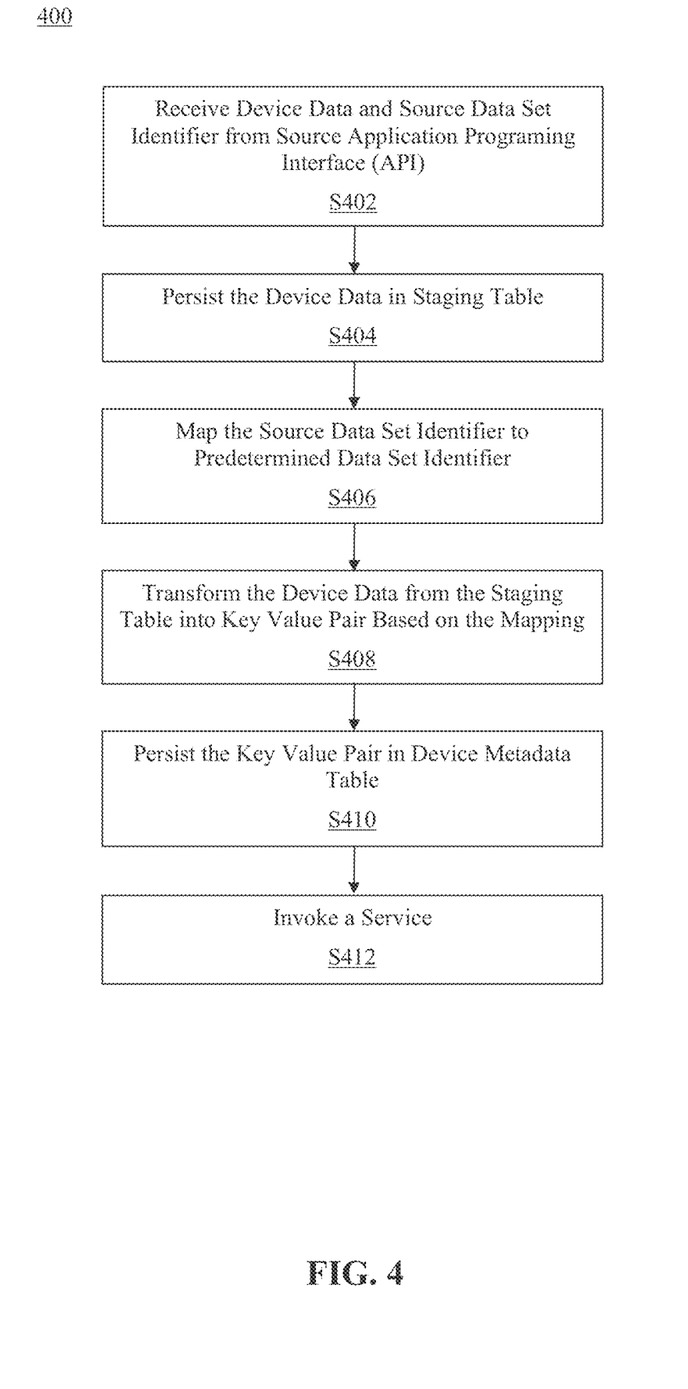
FIG. 4 is a flowchart of an exemplary process for implementing a method for managing relational transactions in a workspace inventory and analytics service by using device agnostic data models and dynamic, configuration driven ingestion of data.

In the process 400 of FIG. 4, at step S402, device data from a source may be retrieved via a communication interface by invoking a source application programming interface (API). The device data may include a source data set identifier. In an exemplary embodiment, the source data set identifier may include a list of columns that are available at the source. The list of columns may include a set of data values of a particular simple type such as, for example, one value for each row of the database. Each row in a database table may provide a data value for each column resulting in a single structured data value. In another exemplary embodiment, the columns may include text values, numbers, and pointers to files in an operating system. Within database systems such as, for example, a relational database system, the columns may contain complex data types such as, for example, whole documents, images, and video clips.

In another exemplary embodiment, the source may include an entity such as, for example, a device manufacturer as well as a system management software such as, for example, a system center configuration manager (SCCM) that identifies and aggregates information relating to various computing components. The source may provide the information in a quantity such as, for example, a batch file and a single data file based on the invoked API. In another exemplary embodiment, the API may include a computing interface which defines interactions between multiple software intermediaries. For example, the API may define the types of calls and requests that can be made, how to make the calls and requests, the data formats that should be used in the calls and requests, and the conventions that the calls and requests must follow. In another exemplary embodiment, retrieving device data via an API may enable flexible ingestion of different device types.

In another exemplary embodiment, the device data may also include information corresponding to a current operating status, operating condition, device creation details, and maintenance details of a device. The device data may be used to define a computing device and include particulars such as, for example, a device model, device components, device component attributes, device peripherals, inventory metrics, and device demographics. The device demographics may correspond to a current state of a device, cost allocation information for the device, and a location of the device. In another exemplary embodiment, the device data may include at least one from among an open standard file format, a proprietary standard file format, and a data interchange format.

At step S404, the device data may be persisted in a staging table within a staging database. In an exemplary embodiment, the staging database may ingest the device data and organize the device data as a set of staging tables with columns and rows. The staging tables may be used to hold information about the objects to be represented in the staging database. In another exemplary embodiment, information within the staging tables may be exposed to networked consumers by using a staging API. The staging API may enable applications such as, for example, a monolithic application and a microservice application to access the staging tables. As will be appreciated by a person of ordinary skill in the art, the persistence of the device data in a staging database may indicate that the device data remains in the staging database after the process which created or retrieved the device data has ended. For example, the device data may be persisted in a staging database because the device data is written to a non-volatile storage component of the staging database.

In another exemplary embodiment, the staging database may utilize a software package such as, for example, a database management system to define, manipulate, retrieve, and manage the device data. As will be appreciated by a person of ordinary skill in the art, the database management system may manipulate the device data itself, the device data format, field names, record structures, and file structures as well as define rules to validate and manipulate the device data.

At step S406, the source data set identifier may be mapped to a predefined data set identifier. In an exemplary embodiment, the predefined data set identifier may include a list of columns that are predefined based on business rules. The list of columns may include a set of data values of a particular simple type such as, for example, one value for each row of the database. Each row in a database table may provide a data value for each column resulting in a single structured data value. In another exemplary embodiment, the columns may include text values, numbers, and pointers to files in an operating system. Within database systems such as, for example, a relational database system, the columns may contain complex data types such as, for example, whole documents, images, and video clips.

In another exemplary embodiment, the predefined data set identifiers may include a predefined column relating to a device identity. The device identity column may define a device based on information corresponding to a current device status, a device condition, a device creation element, and a device maintenance detail. For example, the device identity column may identify a type of laptop such as a GOOGLE Chromebook, as a laptop. In another exemplary embodiment, the predefined data set identifiers may include a predefined column relating to a device model. The device model column may describe various models a device may be classified into. For example, the device model column may classify the Chromebook as a Chromebook 7530 and a Chromebook 7630.

In another exemplary embodiment, the predefined data set identifiers may include a predefined column relating to a device component. The device component column may define the components associated with a particular device. The device component may include any computing component that is an integral part of a device. For example, in a workstation, an operating system of the workstation may be classified as a component. As will be appreciated by a person of ordinary skill in the art, a device such as, for example, a laptop may include a plurality of components while a device such as, for example, a universal serial bus (USB) drive may not include any components.

In another exemplary embodiment, the predefined data set identifiers may include a predefined column relating to a device component attribute. The device component attribute column may associate an attribute to a component by defining the attributes at a device-component level. For example, given a workstation with an operating system, the device component attribute column may include a type of operating system such as MICROSOFT Windows 10.

In another exemplary embodiment, the predefined data set identifiers may include a predefined column relating to a device peripheral. The device peripheral column may define various peripherals that may be packaged together with the device. For example, the device peripheral column may include information corresponding to printers and external hard disks. As will be appreciated by a person of ordinary skill in the art, a device such as, for example, a laptop may include a plurality of peripherals while a device such as, for example, a universal serial bus (USB) drive may not include any peripheral.

In another exemplary embodiment, the predefined data set identifiers may include a predefined column relating to a device inventory metric. The device inventory column may include factual data corresponding to the inventory of a device. For example, the device inventory column may indicate that there are currently 10 laptops of a particular type in inventory at a bank branch. In another exemplary embodiment, the predefined data set identifiers may include a predefined column relating to a device demographic metric. Given a particular device, the device demographic column may describe a state of the device, a cost center of the device, and a location of the device. For example, the device demographic column may indicate that laptop A, which is located at workstation B, is currently counted towards the budget for department C.

At step S408, by using a model, the device data from the staging table may be transformed into a key value pair based on the mapping. In an exemplary embodiment, the transformation may include a change in the file format of the device data. For example, the device data may include files in a JAVASCRIPT Object Notation (JSON) open standard file format and the corresponding key value pair may include files in a different file format. In another embodiment, the transformation of the device data into the key value pair may enable rapid integration of device discovery through a plurality of sources.

In another exemplary embodiment, the model may include at least one from among a data model, a mathematical model, a process model, and a machine learning model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S410, the key value pair may be persisted in a device metadata table within an asset database. In an exemplary embodiment, the device metadata table may be exposed to networked consumers via an asset API. An API gateway may publish the device metadata table to a message bus such as, for example, an APACHE KAFKA stream-processing software platform. As will be appreciated by a person of ordinary skill in the art, the persistence of the key value pair in an asset database may indicate that the key value pair remains in the asset database after the process which created or retrieved the key value pair has ended. For example, the key value pair may be persisted in an asset database because the key value pair is written to a non-volatile storage component of the asset database.

In another exemplary embodiment, a request may be received via the communication interface. The request may include an information inquiry relating to a device. In another exemplary embodiment, the request may be received from at least one from among a user via a graphical user interface and an application via a network. To fulfill the request, the key value pair data may be retrieved from the device metadata table. From the retrieved key value pair, data corresponding to the device may be identified. Then, the identified data corresponding to the device may be transmitted in response to the request.

At step S412, a service may be invoked. In an exemplary embodiment, the service may include a processing mechanism in a service-oriented design paradigm. The processing mechanism may perform a specific task based on a given input. In another exemplary embodiment, the service may exist in a service layer. The service layer may include an architectural pattern that is applied within the service-oriented design paradigm. The architectural pattern may aim to organize the services within a service inventory into a set of logical layers. Services that are categorized into a particular layer may share functionality.

In another exemplary embodiment, the service may include an asset service, an employee service, an occupancy service, an audit service, and at least one utility service. The above services may function within a service layer and may interact with networked databases such as, for example, the asset database, an employee database, an occupancy database, and an authorization database. These services may process the device metadata table according to their assigned function and present the information to a user in a graphical user interface. In another exemplary embodiment, the above services may process the device metadata table according to their assigned functions and expose the resulting data for networked consumers by utilizing an API.

In another exemplary embodiment, the asset service may include a function corresponding to at least one from among a device search function, an asset application programing interface expose function, and a model update function. The asset service may utilize an API gateway to interact with a persistence layer and a staging layer. In another exemplary embodiment, the occupancy service may include a function corresponding to at least one from among a desk detail management function, an occupant search function, a seat location management function, and a communication endpoint management function.

In another exemplary embodiment, the at least one utility service may include an event service, an authorization service, a billing service, and a notification service. The utility services may utilize the message bus to perform support actions based on output from other services in the service layer. In another exemplary embodiment, the event service may include a function corresponding to at least one from among an event creating function, an event publishing function, and an event logging function.

In another exemplary embodiment, the authorization service may include a function corresponding to a user level permission management function. For example, the user level permission management function may be utilized to ensure that a user associated with a device has the necessary permissions to use that device. In another exemplary embodiment, the notification service may include a function corresponding to a sending notification function. The notification function may interact with other services in the service layer to provide information to a user via a graphical user interface. Similarly, in another exemplary embodiment, the billing service may interact with other services in the service layer to monitor and collect usage data for billing purposes. The billing service may also connect with client facing services to provide billing information and with audit APIs to facilitate record keeping.

Figure 5:
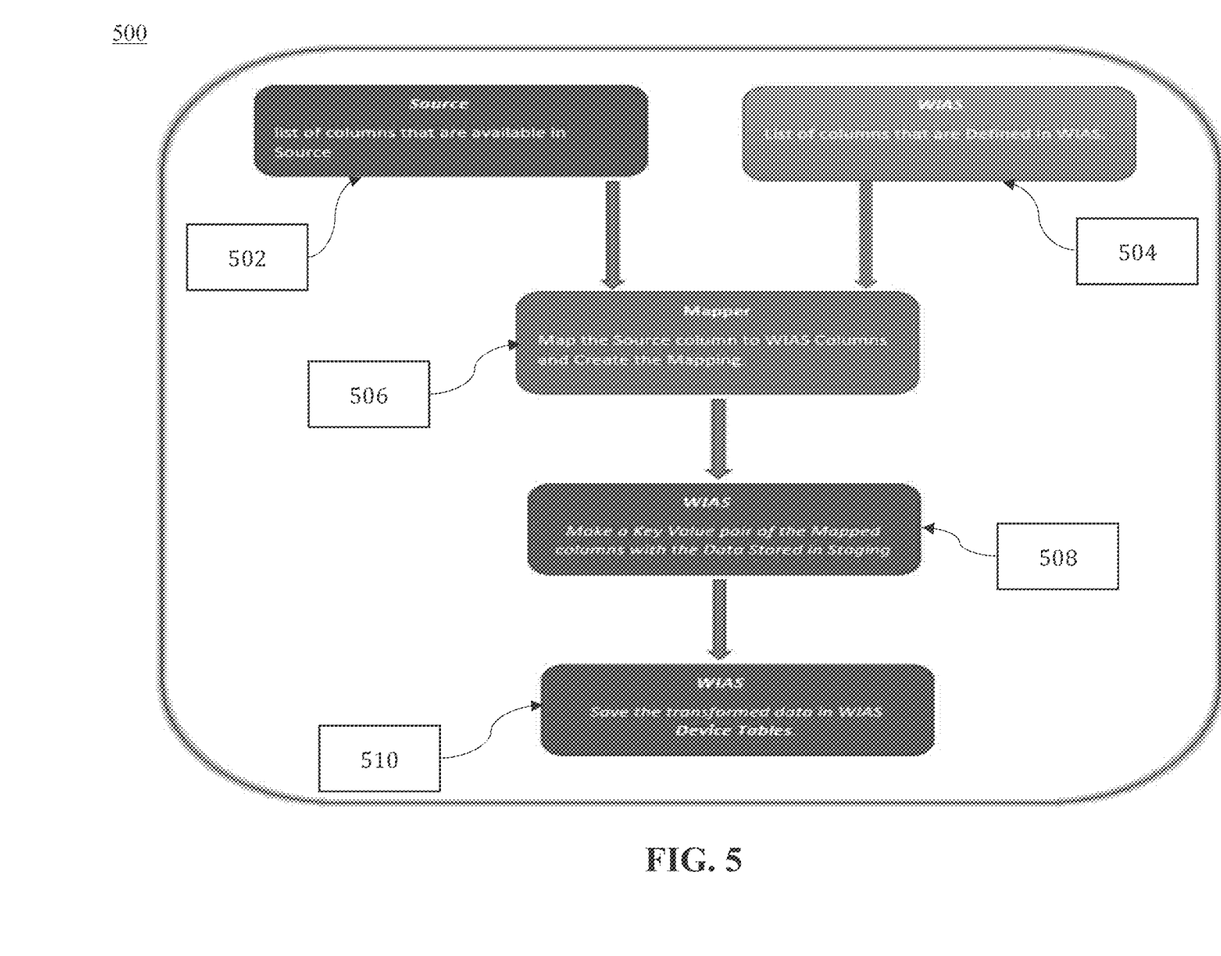
FIG. 5 is a diagram that illustrates an upstream data integration technique that is usable for implementing a method for managing relational transactions in a workspace inventory and analytics service by using device agnostic data models and dynamic, configuration driven ingestion of data, according to an exemplary embodiment.

FIG. 5 is a diagram 500 that illustrates an upstream data integration technique that is usable for implementing a method for managing relational transactions in a workspace inventory and analytics service by using device agnostic data models and dynamic, configuration driven ingestion of data, according to an exemplary embodiment. The upstream data integration technique enables rapid integration of a plurality of device discovery sources by flexibly ingesting different asset types.

As illustrated in FIG. 5, the upstream data integration technique begins at source 502 where a list of columns containing device data is ingested. Similarly, at workspace inventory and analytics service (WIAS) database 504, a list of predefined columns is also retrieved. Then, at mapper 506, the columns from source 502 are mapped to columns from WIAS database 504. Mapper 506 may also generate map data based on a result of the mapping. At WIAS transformer 508, a key value pair is generated for each data element in a staging layer based on the map data. Then, at WIAS storage 510, the key value pair is saved in device tables in a persistence layer FIG. 6 is a diagram 600 that illustrates a system architecture that is usable for implementing a method for managing relational transactions in a workspace inventory and analytics service by using device agnostic data models and dynamic, configuration driven ingestion of data, according to an exemplary embodiment.

Figure 6:
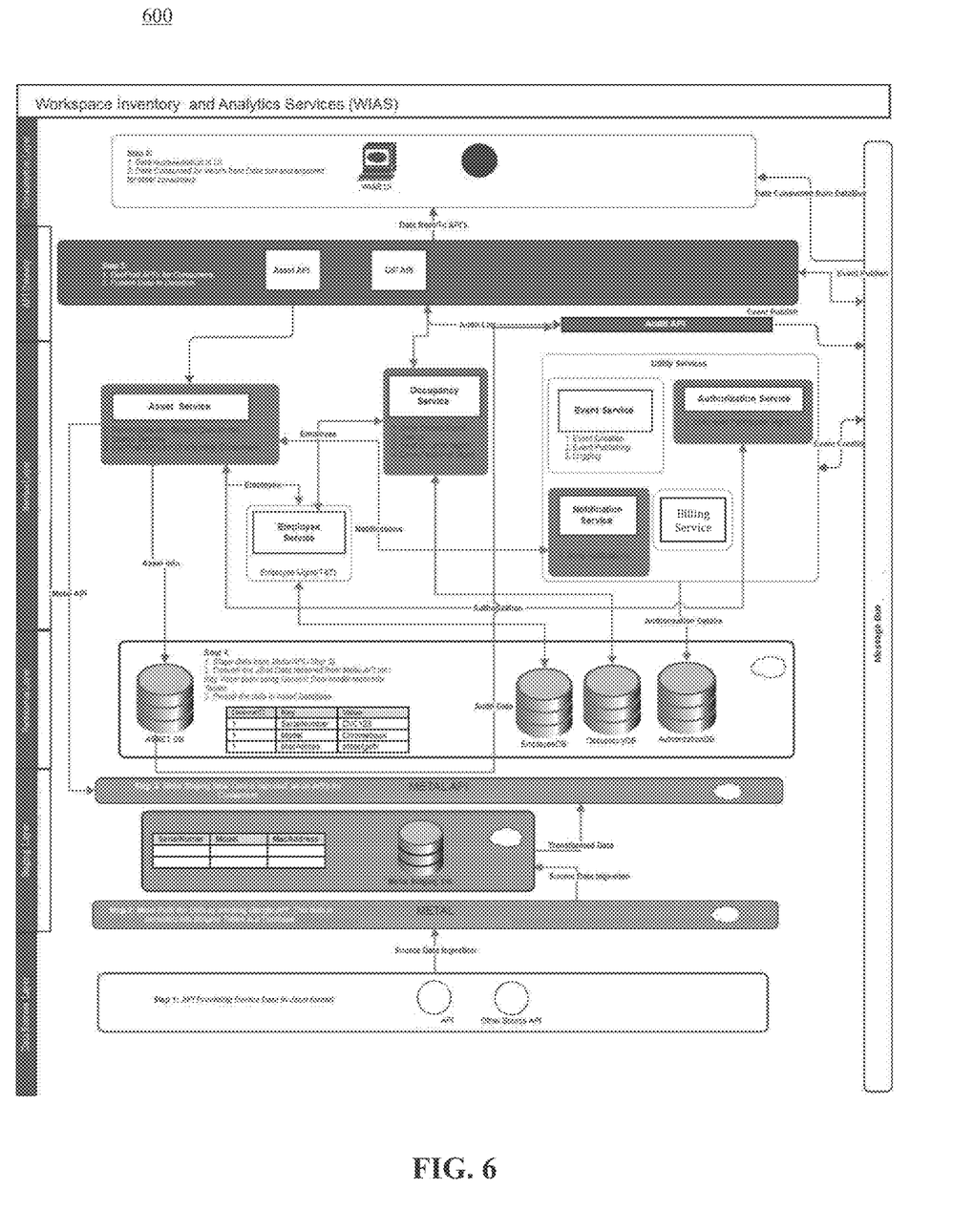
FIG. 6 is a diagram that illustrates a system architecture that is usable for implementing a method for managing relational transactions in a workspace inventory and analytics service by using device agnostic data models and dynamic, configuration driven ingestion of data, according to an exemplary embodiment.

As illustrated in FIG. 6, the system architecture includes a plurality of computing layers titled "Data Source Layer," "Staging Layer," "Persistence Layer," "Service Layer," "API gateway," and "Consumption Layer." A message bus may be utilized to connect the plurality of computing layers. The staging layer may include a staging database and a staging table. The persistence layer may include databases such as, for example, an asset database, an employee database, an occupancy database, and an authorization database.

The service layer may include service functions such as, for example, an asset service, an employee service, an occupancy service, and a utility service. The utility service may include an event service, a notification service, a billing service, and an authorization service. The API gateway may include an asset API that is connected to the asset service and an audit API for the generation and management of audit logs. The consumption layer may include a graphical user interface for the graphical representation of the data for human consumption as well as a mechanism for the generation of computer codes based on the data for application consumption.

In FIG. 6, at step 1, source data is ingested from a source API. Then, at step 2, the source data may be persisted in staging tables in a staging database. At step 3, the staging table data may be exposed via a staging API for consumption. Later, at step 4, data from the staging table may be converted from a source file format into key value pairs using data models and persisted in metadata tables in an asset database. At step 5, data persisted in the metadata tables may be represented in a graphical user interface for a user. The data persisted in the metadata tables may also be exposed via an asset API for consumption.

Accordingly, with this technology, an optimized process for managing relational transactions in a workspace inventory and analytics service by using device agnostic data models and dynamic, configuration driven ingestion of data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing relational transactions in a workspace inventory and analytics service, the method being implemented by at least one processor, the method comprising:

retrieving, by the at least one processor via a communication interface, device data from a source by invoking a source application programming interface, the device data including at least one source data set identifier;

persisting, by the at least one processor, the device data in at least one staging table of at least one staging database;

mapping, by the at least one processor, the at least one source data set identifier to at least one predefined data set identifier;

transforming, by the at least one processor using at least one model, the device data from the at least one staging table into at least one key value pair based on the mapping;

persisting, by the at least one processor, the at least one key value pair in at least one device metadata table of at least one asset database; and invoking, by the at least one processor, at least one service.

2. The method of claim 1, further comprising:

receiving, by the at least one processor via the communication interface, at least one request, the request including an information inquiry relating to a device;

retrieving, by the at least one processor, the at least one key value pair;

identifying, by the at least one processor, data corresponding to the device from the at least one key value pair; and transmitting, by the at least one processor via the communication interface, the data in response to the request.

3. The method of claim 1, wherein the at least one service includes an asset service, an employee service, an occupancy service, an audit service, and at least one utility service.

4. The method of claim 3, wherein the asset service includes a function corresponding to at least one from among a device search function, an asset application programing interface expose function, and a model update function.

5. The method of claim 3, wherein the occupancy service includes a function corresponding to at least one from among a desk detail management function, an occupant search function, a seat location management function, and a communication endpoint management function.

6. The method of claim 3, wherein the at least one utility service includes an event service, an authorization service, a billing service, and a notification service.

7. The method of claim 6, wherein the event service includes a function corresponding to at least one from among an event creating function, an event publishing function, and an event logging function.

8. The method of claim 6, wherein the authorization service includes a function corresponding to a user level permission management function.

9. The method of claim 6, wherein the notification service includes a function corresponding to a sending notification function.

10. The method of claim 1, wherein the device data includes at least one from among an open standard file format, a proprietary standard file format, and a data interchange format.

11. A computing device configured to implement an execution of a method for managing relational transactions in a workspace inventory and analytics service, the computing device comprising:
a processor;
a memory; and
a communication interface coupled to each of the processor and the memory, wherein the processor is configured to:
retrieve, via a communication interface, device data from a source by invoking a source application programming interface, the device data including at least one source data set identifier;
persist the device data in at least one staging table of at least one staging database;
map the at least one source data set identifier to at least one predefined data set identifier;
transform, by using at least one model, the device data from the at least one staging table into at least one key value pair based on the mapping;
persist the at least one key value pair in at least one device metadata table of at least one asset database; and
invoke at least one service.

12. The computing device of claim 11, wherein the processor is further configured to:
receive, via the communication interface, at least one request, the request including an information inquiry relating to a device;
retrieve the at least one key value pair;
identify data corresponding to the device from the at least one key value pair; and
transmit, via the communication interface, the data in response to the request.

13. The computing device of claim 11, wherein the at least one service includes an asset service, an employee service, an occupancy service, an audit service, and at least one utility service.

14. The computing device of claim 13, wherein the asset service includes a function corresponding to at least one from among a device search function, an asset application programing interface expose function, and a model update function.

15. The computing device of claim 13, wherein the occupancy service includes a function corresponding to at least one from among a desk detail management function, an occupant search function, a seat location management function, and a communication endpoint management function.

16. The computing device of claim 13, wherein the at least one utility service includes an event service, an authorization service, a billing service, and a notification service.

17. The computing device of claim 16, wherein the event service includes a function corresponding to at least one from among an event creating function, an event publishing function, and an event logging function.

18. The computing device of claim 16, wherein the authorization service includes a function corresponding to a user level permission management function.

19. The computing device of claim 16, wherein the notification service includes a function corresponding to a sending notification function.

20. The computing device of claim 11, wherein the device data includes at least one from among an open standard file format, a proprietary standard file format, and a data interchange format.

* * * * *